Aug. 11, 1970  R. C. KOZINSKI  3,523,644
RAPID HEAT APPARATUS
Filed July 9, 1968
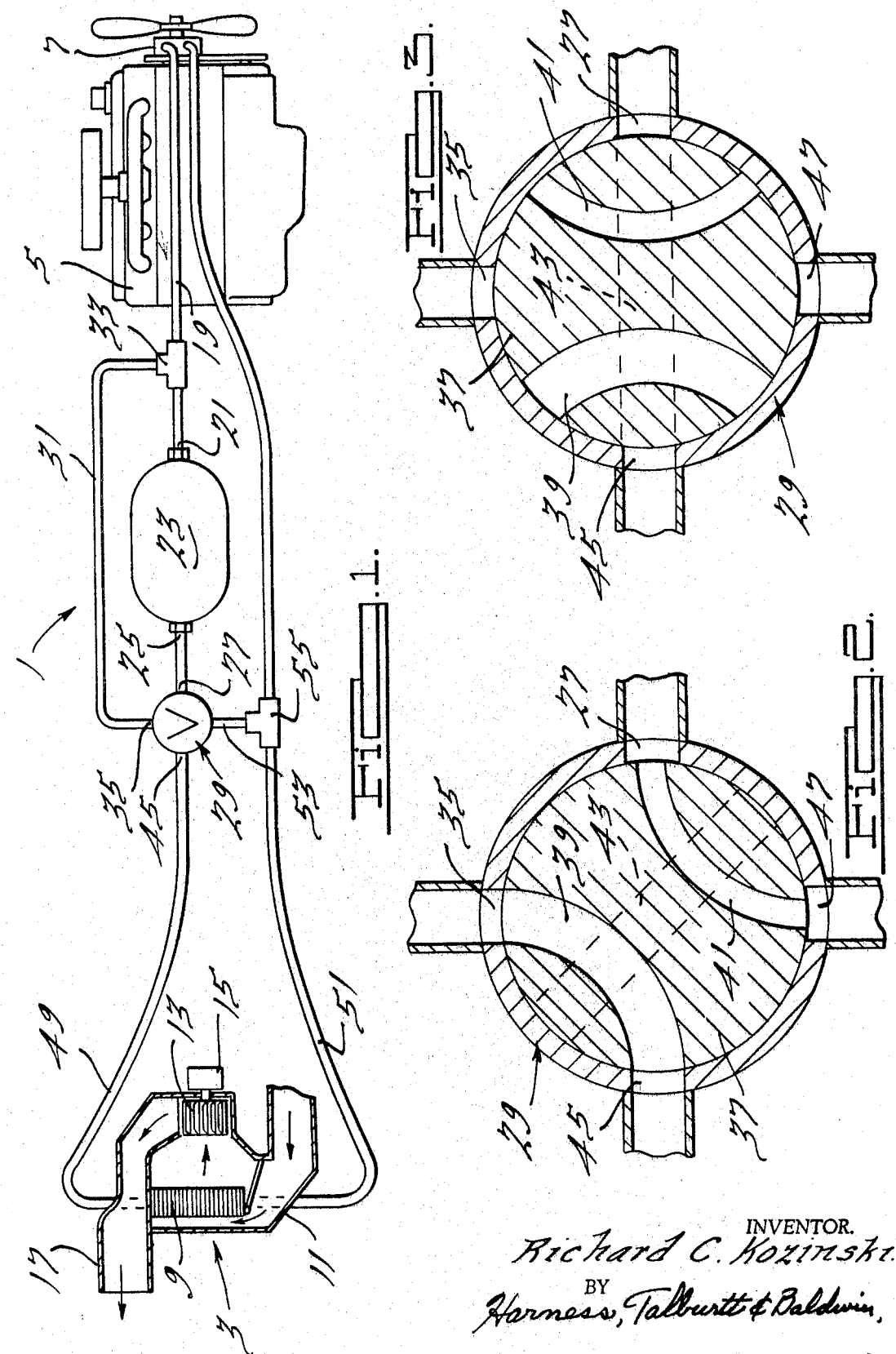
INVENTOR.
Richard C. Kozinski
BY
Harness, Talburtt & Baldwin,
ATTORNEYS.

United States Patent Office 3,523,644
Patented Aug. 11, 1970

3,523,644
RAPID HEAT APPARATUS
Richard C. Kozinski, Warren, Mich., assignor to Chrysler Corporation, Highland Park, Mich., a corporation of Delaware
Filed July 9, 1968, Ser. No. 743,381
Int. Cl. B60h *1/02;* F01p *11/02*
U.S. Cl. 237—12.3                                                4 Claims

ABSTRACT OF THE DISCLOSURE

Rapid heating apparatus for an automotive vehicle including an insulated container in the line through which engine coolant flows to the heater core. The container is adapted to hold and maintain hot a supply of coolant after the engine is stopped. Control means are provided to control the discharge of coolant from the container when the engine is restarted.

BACKGROUND OF THE INVENTION

This invention relates to rapid heat apparatus, and more particularly to apparatus for providing an automotive vehicle with hot air for heating and defrosting purposes during the initial start-up period when the engine is relatively cold.

It is well known that during cool or cold ambient temperature conditions it takes several minutes for an automotive engine, if soaked at the ambient temperature for a period of time, such as overnight, to warm up sufficiently to supply coolant to a heater core at a desired usable temperature. Attempts have been made to provide hot heating and defrosting air to the passenger compartment during this initial start-up period by means of auxiliary heater, such as gas operated or electrical heaters, for example. These heaters, while performing satisfactorily, were often relatively expensive. The convenience of having warm air during this initial start-up period, while desired by customers for comfort reasons, has not been particularly desirable for economic reasons. Moreover, some of the auxiliary heaters occupied space in the passenger compartment, thus reducing the space available for the passengers. According to the present invention many of the disadvantages of prior known auxiliary heating systems are avoided.

SUMMARY OF THE INVENTION

Briefly, this invention comprises an automotive heating system including an insulated container for holding and maintaining hot a supply of hot engine coolant after the engine is stopped, and control means for selectively controlling the discharge of coolant from the container.

One of the primary objects of this invention is to provide heating apparatus for an automotive vehicle adapted to provide relatively hot air for heating and defrosting during the initial start-up period.

Another object of this invention is to provide apparatus such as described adapted to utilize components of the conventional heating system, including the coolant fluid thereof.

A further object of this invention is to provide apparatus of the class described in which the fluid from which heat is removed is heated by the engine prior to the start-up period during which the fluid is used.

Another object of this invention is to provide apparatus of the type described which is adapted to provide warm air until the engine coolant temperature reaches a usable temperature.

Still another object of this invention is to provide apparatus such as described which is economical in construction and reliable in operation.

Other objects and advantages of this invention will be made apparent as the description progresses.

BRIEF DESCRIPTION OF THE DRAWINGS

Referring now to the drawings, in which one of various possible embodiments is illustrated, FIG. 1 is a schematic view of the apparatus of this invention;

FIG. 2 is an enlarged schematic view of a valve shown in FIG. 1, the valve being in one operative position; and FIG. 3 is a view similar to FIG. 2 showing the valve in another operative position.

Like parts are indicated by corresponding reference characters throughout the several views of the drawings.

DESCRIPTION OF THE PREFERRED EMBODIMENT

Referring now to the drawings, apparatus of this invention is shown generally at 1 in FIG. 1. A conventional unit for supplying air for heating and defrosting purposes is indicated at 3 and an automotive engine is shown at 5.

Engine 5 includes a pump 7 for pumping engine coolant through apparatus hereinafter described to a heater core 9 mounted in an air duct housing 11. A blower 13, driven by a motor 15, is provided in housing 11 for moving air from a source, such as ambient or the passenger compartment, through the heater core 9 to an outlet 17 from which the air is delivered by ducts (not shown) to the heater and/or defroster outlets in the passenger compartment.

A coolant carrying line 19 is connected to the outlet of pump 7 and extends to an inlet 21 of a thermally insulated container or storage vessel 23. While the line 19 is schematically shown as connected directly to pump 7, it will be understood that the passages in the engine block through which coolant passes may form part of the line between pump 7 and the container 23. Vessel 23 may have a capacity of approximately twenty to twenty-five pounds of coolant liquid, or approximately two and one-half to three gallons, and may be in the form of various constructions, such as a vacuum-type container or a container having insulated foam plastic walls for example. An outlet 25 of the container 23 is connected to an inlet port 27 of a valve 29. Bypassing insulated container 23 is a line 31 connected at one end to line 19 by a T-connector 33 and at the other end to an inlet port 35 of valve 29.

Valve 27 is shown diagrammatically in FIGS. 2 and 3 to include a rotatable body 37 having three passages 39, 41 and 43 therein. In the position shown in FIG. 2, passage 39 connects inlet port 35 with an outlet port 45 and passage 41 connects inlet port 27 with an outlet port 47. Passage 43 does not connect any of the ports together in the FIG. 2 position. However, in the position shown in FIG. 3, wherein body 37 is rotated counterclockwise approximately 45° from the FIG. 2 position, passage 43 connects inlet port 27 with outlet port 45 and the body 37 blocks communication between each of the ports 35 and 47 with any other port. Suitable controls may be provided to move body 37 between the FIGS. 2 and 3 position in response to coolant liquid temperature in the engine as described hereinafter.

Outlet port 45 is connected by a line 49 to the inlet of heater core 9. The outlet of heater core 9 is connected by a line 51 to the inlet of pump 7. A line 53 connected at one end to port 47 of valve 29 is joined to line 51 by a T-connector 55. Suitable flow control means may be provided in the system to maintain a relatively constant flow at varying pump pressures.

Assuming the engine has been running for a period of time sufficient to raise the engine coolant temperature to 200° F., for example, and that the heater and defrosting controls are set to provide normal or conventional heating and defrosting conditions, operation of the apparatus is as follows:

The valve 29 is set in the FIG. 2 position and coolant is pumped by pump 7 through line 19, line 31, inlet port 35, passage 39, outlet port 45 and line 49 to the heater core 9. Air is forced across the core 9 by blower 13 to remove heat from the coolant in the core. The coolant is returned to the pump 7 from heater core 9 by line 51. A small portion of the 200° F. coolant flows through the insulated container 23, line 26, port 27, passage 41, outlet 47 and line 53 to the line 51 and then back to the pump to maintain approximately 200° F. coolant in the container while the engine is running.

If it is desired to deactivate the heater and defroster system, a conventional valve (not shown) may be operated to prevent the delivery of coolant to the heater core 9.

When the engine is stopped, such as when the vehicle arrives in the garage of the vehicle operator's residence, for example, the insulated container 23 is charged with coolant at approximately 200° F. While the engine is shut down, the coolant in the container is maintained relatively hot, losing for example, approximately 1° F. or less per hour when the ambient temperature is very low such as −10° F. for example. If the vehicle is not started for a period of 12–15 hours, for example, such as overnight, the coolant temperature in the insulated container might be approximately 180°–190° F.

The coolant throughout the remainder of the system is close to ambient after a 12–15 hour period. When the engine is started, the heater-defroster controls may be immediately actuated to move valve body 37 from its FIG. 2 position to its FIG. 3 position. This places line 26 in communication with line 49 through passage 43 and pump 7, forces the hot coolant in the container 23 through line 49 into the heater core from which heat is removed by air drawn therethrough by blower 13. In this regard the container may have some means, such as baffling or a movable diaphragm, for example, to inhibit mixing of the cold coolant pumped into the container and the hot coolant being forced from the container into the heater core. The supply of hot coolant in the insulated container is sufficient to provide relatively hot coolant to the heater core, and thus permit near maximum heater output for a period approximately three to four minutes or until engine coolant temperature reaches a usable point.

When the engine coolant reaches the predetermined usable temperature, the valve 29 which may be operated by a temperature sensing control, or manually, is actuated to its FIG. 2 position. Thus, most of the hot engine coolant bypasses the container 23 and flows directly to the heater core 9. The remaining pump output flows through the container and through passage 41 in valve 29 into the return line 51, thereby gradually recharging the container with hot coolant so that an ample supply will be available for the next desired rapid heat operation.

It will be seen that the rapid heating system of the present invention will remain in an effective condition only for a predetermined length of time after a hot engine is stopped. For example, if an engine is not run for a week, the coolant in the insulated container would probably have a temperature equal to the coolant throughout the remainder of the engine cooling system. However, inasmuch as most automotive vehicles are used daily, the apparatus of this invention is practical and an advantageous feature.

In one test of the apparatus, an insulated container contained approximately 22.5 lbs. of coolant at an initial temperature of 200° F. The apparatus was soaked, i.e., placed in an environment, for nineteen hours at −10° F. At the end of nineteen hours, the apparatus was placed in operation and within one minute, the automotive heater was delivering air recorded at 110° F. The actual temperature of the coolant in the container had dropped only 6° F. to 194° F., or less than one-half degree Farenheit per hour.

It will thus be seen that the apparatus of this invention is effective in supplying hot coolant to the heater core upon engine start-up, provided or course, that the engine has not been shut down for an unusually long time.

In view of the foregoing it will be seen that the several objects and other advantages are attained.

While a preferred embodiment of the invention has been illustrated and described in detail, it is to be understood that various changes may be made in the disclosed embodiment without departing from the scope or spirit of the invention.

I claim:

1. Rapid heating apparatus for an automotive vehicle comprising a heater core, an engine coolant pump connected to and driven by the engine of said vehicle, delivery means connecting said pump to said heater core for delivering engine coolant heated by said engine directly from said pump through said engine to said heater core, return means connecting said heater core to said pump for returning engine coolant from said heater core to said pump, said delivery means further including an insulated container for holding a supply of hot engine coolant and for maintaining the coolant therein at a relatively high temperature for a period of time, and control means for controlling the discharge of coolant from said insulated container through said delivery means to said heater core, said control means including means for bypassing coolant from said pump around said insulated container as the coolant is delivered from said pump to said heater core.

2. Rapid heating apparatus for an automotive heating system of the type including an engine coolant pump driven by the automotive engine, a heater core, delivery means for delivering coolant from the pump through the engine to the heater core, and return means for returning coolant from the heater core to the pump; said apparatus including an insulated container in said delivery means for holding a supply of hot engine coolant and maintaining the coolant therein at a relatively high temperature after the engine is stopped, said supply of hot engine coolant being available for delivery to the heater core when the engine is started, control means in said delivery means for selectively controlling the delivery of said supply of hot engine coolant to the heater core, said delivery means further including a first line connecting said pump to said insulated container, a second line connected to said heater core, said controls means including valve means connected between said container and said second line, a third line bypassing said container and extending from said first line to said valve means, said valve means being movable between a first position wherein communication between said container and said second line is blocked to a second position wherein communication between said container and said second line is established.

3. Rapid heating apparatus as set forth in claim 2 further including a fourth line connecting said valve means to said return means, said valve means when in said first position, placing said second line in communication with said third line and said container in communication with said fourth line.

4. Rapid heating apparatus as set forth in claim 3 wherein said insulated container has a volume in excess of two gallons.

References Cited

UNITED STATES PATENTS

| 1,158,691 | 11/1915 | Kohnle _____ | 123—41.14 |
| 1,789,283 | 1/1931 | Usborne _____ | 123—41.14 |
| 2,408,183 | 9/1946 | Wood _____ | 123—41.14 |

EDWARD J. MICHAEL, Primary Examiner

U.S. Cl. X.R.

123—41.14